No. 675,029. Patented May 28, 1901.
E. R. WALBORG & W. H. McINTOSH.
BREAD OR PASTRY TRAY.
(Application filed July 6, 1900.)
(No Model.)
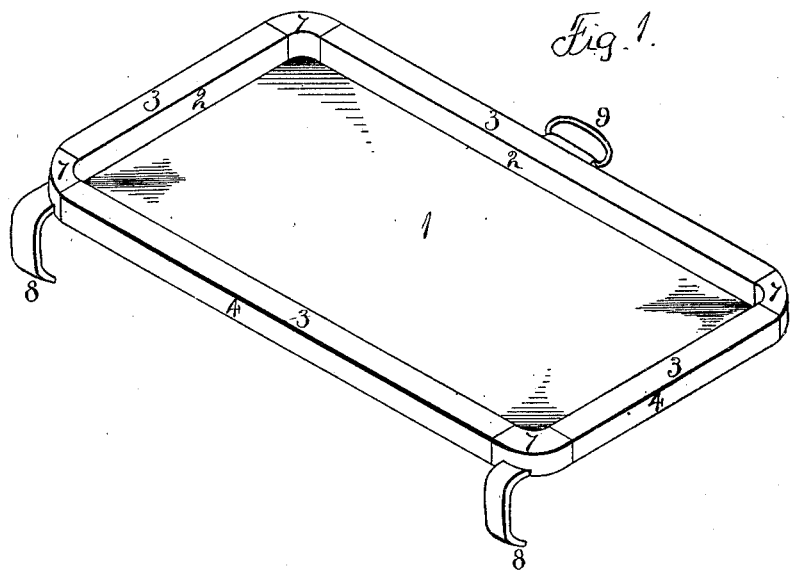
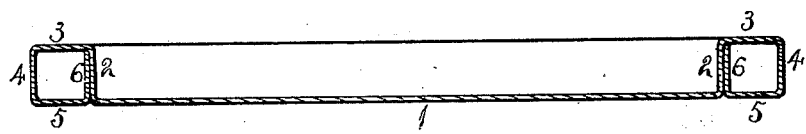
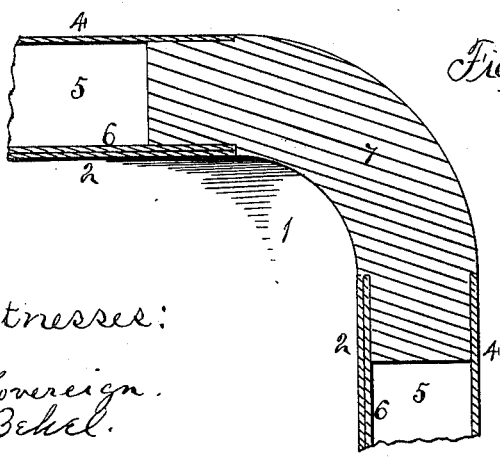
Witnesses:
J. Sovereign.
E. Behel.
Inventors:
Edward R. Walborg
William H. McIntosh
By A. O. Behel
Attys.

UNITED STATES PATENT OFFICE.

EDWARD R. WALBORG AND WILLIAM H. McINTOSH, OF ROCKFORD, ILLINOIS.

BREAD OR PASTRY TRAY.

SPECIFICATION forming part of Letters Patent No. 675,029, dated May 28, 1901.

Application filed July 6, 1900. Serial No. 22,756. (No model.)

*To all whom it may concern:*

Be it known that we, EDWARD R. WALBORG and WILLIAM H. McINTOSH, citizens of the United States, residing at Rockford, in the county of Winnebago and State of Illinois, have invented certain new and useful Improvements in Bread or Pastry Trays, of which the following is a specification.

The object of this invention is to construct a bread and pastry tray which shall be non-absorbent, strong, light, and durable.

In the accompanying drawings, Figure 1 is an isometrical representation of our improved bread and pastry tray. Fig. 2 is a vertical section. Fig. 3 is a horizontal section showing the end connection.

The body portion of our improved tray is made from a single piece of sheet material and composed of the bottom 1, ends, and sides. The ends and sides are formed with the vertical inner section 2, top section 3, outside section 4, bottom section 5, and vertical return-section 6. These sections form a square bead, the corners being cut away. The corners 7 are filled in with molded material, the metal running into the ends of the beads, as shown at Fig. 3, and forming a soldered connection with the bottom of the tray. To two of the corners are secured projections 8, in this instance of curved form. A ring 9 is secured to one of the side beads of the tray, by means of which it is hung up. A tray constructed in this manner has a smooth interior surface, thereby permitting of its ready cleaning, and the projection coming in contact with the edge of the table holds it in position on the table.

We claim as our invention—

A bread and pastry tray comprising a bottom, sides and ends, the sides and ends turned to form hollow square beads, and molded corners connecting the bottom, sides and ends and conforming to the outward shape of the sides and ends, a portion of the metal forming the corners entering the open ends of the sides and ends.

EDWARD R. WALBORG.
WILLIAM H. McINTOSH.

Witnesses:
A. O. BEHEL,
E. BEHEL.